2,990,320
SYNERGISTIC INSECTICIDAL PYRETHRIN COMPOSITIONS CONTAINING N-ALKOXY ALKYL-3,4 METHYLENE DIOXYPHENYL CARBAMATES
Robert J. Hartle, Gibsonia, and Helen I. Thayer, Pittsburgh, Pa., assignors to Gulf Research & Development Company, Pittsburgh, Pa., a corporation of Pennsylvania
No Drawing. Filed Dec. 29, 1959, Ser. No. 862,485
11 Claims. (Cl. 167—24)

This invention relates to new organic compounds having valuable properties as synergists for pyrethrin insecticides. The invention also relates to insecticidal compositions comprising one or more of the new compounds of the invention in admixture with pyrethrin insecticides.

The new compounds which we have found to substantially enhance the insecticidal effectiveness of pyrethrins are 3,4-methylenedioxyphenyl N-alkoxyalkyl carbamates. These compounds may be designated by the general formula:

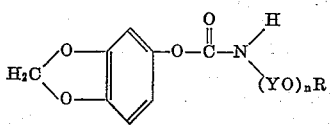

in which Y is an alkylene group containing from 2 to 4 carbon atoms, $n$ is an integer from 1 to 3 and R is an alkyl radical containing from 1 to about 16 carbon atoms.

The 3,4-methylenedioxyphenyl N-alkoxyalkyl carbamates embraced by the invention can be prepared by reacting a 3,4-methylenedioxyphenyl chloroformate with a slight excess of an alkoxyalkyl amine. Thus, for example, a highly effective pyrethrin synergist, 3,4-methylenedioxyphenyl N-n-butoxyethoxyethylcarbamate was prepared by reacting 3,4-methylenedioxyphenyl chloroformate with n-butoxyethoxyethyl amine.

The preparation of 3,4-methylenedioxyphenyl N-n-butoxyethoxyethyl carbamate proceeded as follows: The 3,4-methylenedioxyphenyl chloroformate was prepared according to the procedure of Strain et al. as described in the Journal of the American Chemical Society, volume 72, page 1254, 1950. Utilizing that method, a solution of 55.3 grams (0.40 mol) of sesamol (3,4-methylenedioxyphenol) in 250 cubic centimeters of benzene was chilled to 5° C. Fifty cubic centimeters of anhydrous ethyl ether was added to the solution to prevent precipitation of the sesamol. Phosgene was then passed into the cold solution at such a rate that absorption of the gas was complete. A total of 49 grams (0.50 mol) of phosgene was added to the solution. Sixty-one grams (0.41 mol) of N-N-diethylaniline was then added dropwise to the mixture with rapid stirring. The reaction temperature was maintained at 0° to 5° C. during this addition which required approximately 45 minutes. The mixture was allowed to stand at room temperature over night and was then washed successively with 300 cubic centimeter portions of ice water, dilute hydrochloric acid and ice water. The organic phase was dried over calcium chloride and the solvent was removed at reduced pressure. The residue was vacuum distilled to yield 59.3 grams (74 percent yield) of 3,4-methylenedioxyphenyl chloroformate, having a boiling point of 112° to 114° C. at a pressure of 4.5 millimeters Hg.

The second reactant, n-butoxyethoxyethylamine was obtained by a Gabriel reaction on butoxyethoxyethyl chloride (butylcarbityl chloride). To a solution of 103 grams (0.57 mol) of butoxyethoxyethyl chloride in 400 milliliters of dimethylformamide was added 0.5 gram of sodium iodide and 105.5 grams (0.57 mol) of potassium phthalimide. The mixture was refluxed with stirring for five hours. After cooling, the mixture was diluted with 500 milliliters of chloroform and added to 2000 milliliters of water. The water layer was extracted twice with 200 milliliter portions of chloroform. The combined chloroform layers were washed with 500 milliliters of 0.2 N sodium hydroxide solution followed by a water wash. The chloroform solution was dried and filtered. The solvent was removed by distillation leaving 135 grams (0.46 mol) of n-butoxyethoxyethyl phthalimide. This product was dissolved in 450 milliliters of 95 percent ethanol and treated with 9 grams of water followed by 16 grams of hydrazine (95+%). The mixture was refluxed 3 hours with stirring. Then concentrated hydrochloric acid (45 milliliters) was added, and the mixture was filtered to remove phthalhydrazide. The solid was washed with ethanol, and the total filtrate was concentrated under reduced pressure (50 mm. Hg) until solid precipitated. Water (250 milliliters) was added and the distillation was repeated. The residue was treated with 100 grams of 40 percent sodium hydroxide and saturated with potassium carbonate. The oil which separated was taken up in ether and the ether solution treated with sodium hydroxide pellets and filtered. After removing the solvent, the product was distilled at reduced pressure to yield 35 grams of n-butoxyethoxyethylamine, a colorless liquid having a boiling point of 85–87° C. at a pressure of 6.5 mm. Hg.

After obtaining the 3,4-methylenedioxyphenyl chloroformate and the butoxyethoxyethylamine reactants, synthesis of the 3,4-methylenedioxyphenyl N-n-butoxyethoxyethyl carbamate proceeded. A solution of 33 grams (0.21 mol) of n-butoxyethoxyethyl amine dissolved in 250 cubic centimeters of anhydrous ether was chilled to 0° C. To this solution was added dropwise with stirring a solution of 20 grams (0.10 mol) of 3,4-methylenedioxyphenyl chloroformate in 100 milliliters of anhydrous ether. During the addition, the temperature was maintained at between 0° and 5° C. The mixture was stored at room temperature over night and was then washed with 50 milliliters of dilute hydrochloric acid and 50 milliliters of water. The ether layer was dried over calcium chloride, filtered and the solvent distilled off. The last traces of solvent and unreacted starting materials were removed by warming to 70° C. at a pressure of 2 millimeters Hg for a period of about 15 minutes. The product, 3,4-methylenedioxyphenyl N-n-butoxyethoxyethyl carbamate was clear amber liquid.

*Analysis.*—Calculated for $C_{16}H_{23}O_6N$: N, 4.30%. Found: N, 4.08%.

A large number of 3,4-methylenedioxyphenyl N-alkoxyalkyl carbamates may be prepared by the general reaction of 3,4-methylenedioxyphenyl chloroformate with an alkoxyalkyl amine. Representative esters of the group include:

3,4-methylenedioxyphenyl N-3-methoxyethoxypropyl carbamate,
3,4-methylenedioxyphenyl N-ethoxyethoxyethyl carbamate,
3,4-methylenedioxyphenyl N-methoxyethoxyethyl carbamate,
3,4-methylenedioxyphenyl N-(2-methoxyethyl) carbamate,
3,4-methylenedioxyphenyl N-(3-methoxypropyl) carbamate,
3,4-methylenedioxyphenyl N-(3-ethoxypropyl) carbamate,
3,4-methylenedioxyphenyl N-propoxyethoxyethyl carbamate,
3,4-methylenedioxyphenyl N-(3-isopropoxypropyl) carbamate, 3,4-methylenedioxyphenyl N-butoxyethoxyethyl carbamate,
3,4-methylenedioxyphenyl N-3-butoxypropyl carbamate, solvent was a deodorized light petroleum oil having a specific gravity of 0.78 and a distillation range of 380–480° F.

Table I

| Compound | Solvent, Volume Percent Alcohol in Petroleum Oil | Concentration of Compound (mg. per 100 cc. solvent) | Percent Kill (24 Hours) | | |
|---|---|---|---|---|---|
| | | | Compound Alone (in 100 cc. solvent) | Pyrethrins Alone (50 mg./100 cc. solvent) | 50 mg. pyrethrins+ (mg. compound in 100 cc. solvent) |
| 3,4-methylenedioxyphenyl N-(2-methoxyethyl) carbamate. | 1.25 Ethyl Alcohol | 100 | | 35.4 | 63.0 |
| | 6.25 Ethyl Alcohol | 500 | | 35.4 | 97.6 |
| | 12.5 Ethyl Alcohol | 1,000 | 3.8 | 35.4 | 100.0 |
| 3,4-methylenedioxyphenyl N-(3-methoxypropyl) carbamate. | 1.0 Ethyl Alcohol | 100 | | 35.4 | 67.2 |
| | 5.0 Ethyl Alcohol | 500 | | 35.4 | 99.8 |
| | 10.0 Ethyl Alcohol | 1,000 | 3.0 | 35.4 | 100.0 |
| 3,4-methylenedioxyphenyl N-(3-isopropoxypropyl) carbamate. | 0.5 Ethyl Alcohol | 100 | | 35.4 | 93.4 |
| | 2.5 Ethyl Alcohol | 500 | | 35.4 | 100.0 |
| | 5.0 Ethyl Alcohol | 1,000 | 19.8 | 35.4 | 100.0 |
| 3,4-methylenedioxyphenyl N-butoxyethoxyethyl carbamate. | 0.175 Octyl Alcohol | 100 | | 59.8 | 100.0 |
| | 0.875 Octyl Alcohol | 500 | | 59.8 | 100.0 |
| | 1.75 Octyl Alcohol | 1,000 | | 59.8 | 100.0 |

3,4-methylenedioxyphenyl N-butoxypropoxyethyl carbamate.

Any of the materials commonly employed in insecticidal compositions as solvents for pyrethrum insecticide toxicants can be employed in accordance with the present invention. These solvents include light petroleum fractions such as deodorized naphthas, kerosene, lubricating oils of light viscosity, aromatic hydrocarbons, such as benzene, toluene, alkylnaphthalenes such as alpha-methylnaphthalene, acetone and alcohols. The solubility of the 3,4-methylenedioxyphenyl alkoxyalkyl carbamates in petroleum distillates can be improved if desired by supplying small amounts of a secondary solvent. Among the secondary solvents which may advantageously be used to increase the solubility of the synergists in petroleum distillates are alcohols such as ethyl, isopropyl, octyl, decyl, acetone, methyl ethyl ketone, toluene, xylene and benzene and the like.

Relatively small quantities of the disclosed 3,4-methylenedioxyphenyl alkoxyalkyl carbamates are employed in insecticidal compositions to enhance the killing effect of the pyrethrin insecticide toxicants. Improvement in kill is obtained by addition of the 3,4-methylenedioxyphenyl N-alkoxyalkyl carbamates in amounts from about 10 milligrams/100 cubic centimeters of solvent to about 2000 milligrams/100 cubic centimeters of solvent. Preferably, the novel synergists are employed in amounts between about 25 and 500 milligrams/100 cubic centimeters of solvent. The most useful proportions of pyrethrins are between about 20 and about 2000 milligrams/100 cubic centimeters of solvent.

The enhancing effect of the 3,4-methylenedioxyphenyl alkoxyalkyl carbamates on the insecticidal activity of pyrethrins is shown in Table I. In these tests, insecticidal compositions comprising pyrethrins in admixture with the novel compounds of the invention were tested against house flies. The fly killing test employed was the Barnhart tower test, or as it is commonly known, the mist tower method for testing insecticides. The Barnhart spray tower utilized in the test is adapted for the controlled application of a settling mist and consists of a vertical spray tower of two concentric Celluloid cylinders. The dosage of spray is delivered by means of a De Vilbiss artist's air brush as a fine mist. A slide permits the larger droplets to settle for a desired time to form a standard mist. The slide is then moved and the flies which are confined in paper dishes covered with wire screen, are exposed for a time to the standard mist. Sugar water solution is applied to the treated cage and the percent dead is determined 24 hours after treatment. This apparatus is described in detail in the 1941 issue of Soap and Sanitary Chemicals, volume #7, pages 105–115. The petroleum oil employed as principal To further illustrate the synergistic effects of the 3,4-methylenedioxyphenyl alkoxyalkyl carbamates with pyrethrins, a number of killing tests were conducted on roaches. The test employed was that described by Albert C. Miller et al. in the Journal of Economic Entomology, vol. 47, pages 23–26, February 1954, which is referred to as the Gulf racetrack method of testing. The same petroleum distillate described above was employed as a solvent. The results shown below are the average results of 10 replicates of 20 German male cockroaches each.

Table II

| Spray Composition (100 cc. solvent) | Dosage, cc. | 30 Minute Knockdown | 48 Hours Dead and Moribund |
|---|---|---|---|
| 50 mg. pyrethrins | 3 | 99.5 | 31 |
| 50 mg. pyrethrins+250 mg. 3,4-methylenedioxyphenyl N-butoxyethoxyethyl carbamate | 3 | 100 | 86 |

Compositions prepared in accordance with our invention are useful in combatting a variety of insect pests such as flies, moths, aphids, ants, roaches and the like.

The expression "consisting essentially of" as used in the claims means that the insecticidal composition is made up of the components recited and these components are the characterizing ones. But the expression does not exclude the presence of minor amounts of materials which do not affect the basic and novel characteristics of the composition.

Those modifications and equivalents which fall within the spirit of the invention and the scope of the appended claims are to be considered part of the invention.

We claim:

1. A 3,4-methylenedioxyphenyl N-alkoxyalkyl carbamate having the structure:

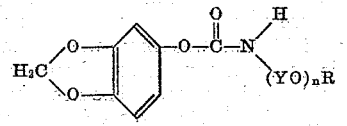

in which Y is an alkylene group containing from 2 to 4 carbon atoms, n is an integer from 1 to 3 and R is an alkyl radical containing from 1 to 16 carbon atoms.

2. The compound 3,4-methylenedioxyphenyl N-(2-methoxyethyl) carbamate.

3. The compound 3,4-methylenedioxyphenyl N-(3-methoxypropyl) carbamate.

4. The compound 3,4-methylenedioxyphenyl N-(3-isopropoxypropyl) carbamate.

5. The compound 3,4-methylenedioxyphenyl N-butoxyethoxyethyl carbamate.

6. An insecticidal composition consisting essentially of a pyrethrin insecticide toxicant, a solvent therefor and a 3,4-methylenedioxyphenyl N-alkoxyalkyl carbamate having the structure:

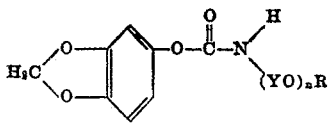

in which Y is an alkylene group containing from 2 to 4 carbon atoms, $n$ is an integer from 1 to 3 and R is an alkyl radical containing from 1 to 16 carbon atoms.

7. The composition of claim 6 wherein the said solvent is a hydrocarbon solvent.

8. An insecticidal composition consisting essentially of a pyrethrin insecticide toxicant, a solvent therefor, and 3,4-methylenedioxyphenyl N-butoxyethoxyethyl carbamate.

9. An insecticidal composition consisting essentially of a pyrethrin insecticide toxicant, a solvent therefor, and 3,4-methylenedioxyphenyl N-(3-isopropoxypropyl) carbamate.

10. An insecticidal composition consisting essentially of a pyrethrin insecticide toxicant, a solvent therefor, and 3,4-methylenedioxyphenyl N-(3-methoxypropyl) carbamate.

11. An insecticidal composition consisting essentially of a pyrethrin insecticide toxicant, a solvent therefor, and 3,4-methylenedioxyphenyl N-(2-methoxyethyl) carbamate.

References Cited in the file of this patent

UNITED STATES PATENTS 2,856,411    Prill _____ Oct. 14, 1958